(Model.)

A. WEYER.
METHOD OF ORNAMENTING GLASS ARTICLES.

No. 298,145. Patented May 6, 1884.

WITNESSES:
Jol. N. Rosenbaum.
Otto Risch.

INVENTOR
August Weyer
BY Goepel & Raegener
ATTORNEYS.

UNITED STATES PATENT OFFICE.

AUGUST WEYER, OF LONG ISLAND CITY, NEW YORK.

METHOD OF ORNAMENTING GLASS ARTICLES.

SPECIFICATION forming part of Letters Patent No. 298,145, dated May 6, 1884.

Application filed August 9, 1883. (Model.)

*To all whom it may concern:*

Be it known that I, AUGUST WEYER, of Long Island City, in the county of Kings and State of New York, have invented certain new and useful Improvements in Methods of Ornamenting Glass Articles, of which the following is a specification.

The object of this invention is to produce an improved method of ornamenting articles of glass of all kinds—such as glass tiles, vases, knobs, lamp-bodies, and the like—in different colors and designs; and the invention consists in transferring differently-colored pieces of glass enamel of suitable size by transfer-sheets covered with a suitable adhesive substance to the body of the article of glass that has been softened by heat, then bedding said glass enamel into the body of the articles of glass by pressure, and finally fusing the so-transferred designs into the glass body in the usual manner.

Figure 1:
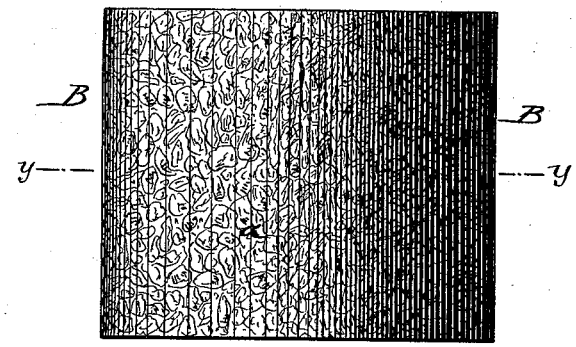
Figure 2:
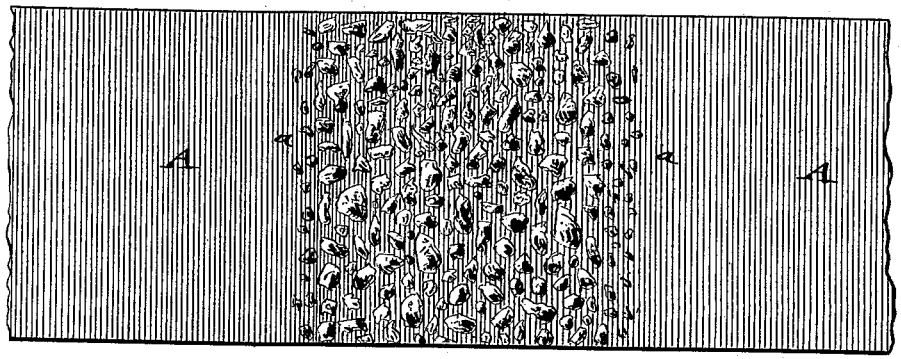
Figure 3:
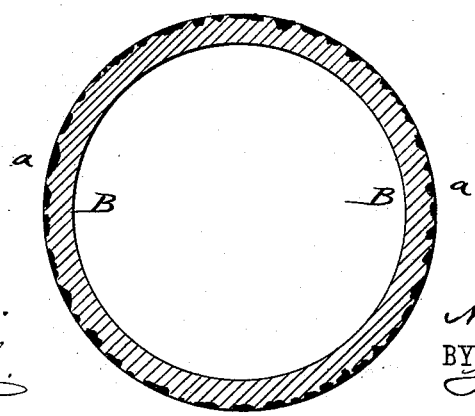

In the accompanying drawings, Figure 1 represents an article of glass of cylindrical shape, ornamented according to my improved method. Fig. 2 is a piece of paper used in transferring the glass enamel; and Fig. 3 a horizontal section of the glass body on line *y y*, Fig. 1.

Similar letters of reference indicate corresponding parts.

In carrying my invention into practice, leaves of paper which have been preferably treated with a suitable silicate solution, so as to render the same less inflammable, are used for transferring colored-glass enamel to the glass bodies to be ornamented. The surface of the transfer-sheet A is coated with mucilage or any other suitable adhesive substance to which the pieces of glass enamel adhere. In place of paper sheets, sheets of any other material—
such as copper or other suitable sheet metal—can be used for transferring the designs to the glass bodies. The smaller pieces *a* of glass enamel adhere to the surface of the transfer-sheet, which is then withdrawn, and are transferred to the body of glass that is to be ornamented by the sheet, after said body has first been treated to such a degree of softness that it will readily receive and retain the pieces of glass enamel. The differently-colored parts of the design are transferred in the same manner until the entire design is reproduced on the article of glass. The pieces *a* of glass enamel are embedded into the soft body of glass by pressure applied to the back of the transfer-sheet. The glass body is then exposed to the heat of a suitable muffle, so that the glass enamel fuses and forms an integral part of the glass body B.

If it be desired to impart to the surface of the glass body a design—as in the case of tiles, &c.—having figures in relief, the glass body is pressed and then exposed to the fusing-heat in a proper mold having depressions corresponding to the design to be represented in relief. The transfer-sheets are carbonized by the heat of the muffle, together with the mucilage, the carbon being finally removed by washing. In this manner a variety of different artistic effects can be produced on articles of glass in a very durable and comparatively inexpensive manner, so that articles thus treated can be used in the place of the more expensive china and earthenware articles heretofore employed for ornamental purposes.

Having thus described my invention, I claim as new and desire to secure by Letters Patent—

The method herein described of ornamenting articles of glass, which consists in transferring pieces of suitable glass enamel by transfer-sheets covered with adhesive substance to a glass body while in a soft state, then pressing said enamel into the soft body of the glass article, and finally fusing the enamel into said glass body, substantially as set forth.

In testimony that I claim the foregoing as my invention I have signed my name in presence of two subscribing witnesses.

AUGUST WEYER.

Witnesses:
PAUL GOEPEL,
SIDNEY MANN.